(12) United States Patent
Shimazawa et al.

(10) Patent No.: US 10,872,628 B1
(45) Date of Patent: Dec. 22, 2020

(54) NEAR-FIELD TRANSDUCER WITH AU NANO ROD

(71) Applicant: Headway Technologies, Inc., Milpitas, CA (US)

(72) Inventors: Koji Shimazawa, Cupertino, CA (US); Weihao Xu, San Jose, CA (US)

(73) Assignee: Headway Technologies, Inc., Milpitas, CA (US)

(*) Notice: Subject to any disclaimer, the term of this patent is extended or adjusted under 35 U.S.C. 154(b) by 0 days.

(21) Appl. No.: 16/800,049

(22) Filed: Feb. 25, 2020

(51) Int. Cl.
| G11B 5/31 | (2006.01) |
| G11B 5/60 | (2006.01) |
| G11B 5/127 | (2006.01) |
| G11B 7/124 | (2012.01) |
| G11B 7/1387 | (2012.01) |
| G11B 13/08 | (2006.01) |
| G11B 5/00 | (2006.01) |

(52) U.S. Cl.
CPC ............ *G11B 5/314* (2013.01); *G11B 5/1278* (2013.01); *G11B 5/3116* (2013.01); *G11B 5/3163* (2013.01); *G11B 5/6082* (2013.01); *G11B 7/124* (2013.01); *G11B 7/1387* (2013.01); *G11B 13/08* (2013.01); *G11B 2005/0021* (2013.01)

(58) Field of Classification Search
CPC ..... G11B 5/314; G11B 5/1278; G11B 5/3116; G11B 5/3163
USPC .................. 360/125.1–125.5, 125.31–125.35
See application file for complete search history.

(56) References Cited

U.S. PATENT DOCUMENTS

| 8,000,178 | B2 | 8/2011 | Shimazawa et al. | |
| 8,488,419 | B1 | 7/2013 | Jin et al. | |
| 8,804,468 | B2 | 8/2014 | Zhao et al. | |
| 9,019,803 | B1 | 4/2015 | Jin et al. | |
| 9,064,515 | B2 | 6/2015 | Zhao et al. | |
| 9,099,112 | B1 | 8/2015 | Balamane et al. | |
| 9,129,620 | B2 | 9/2015 | Cheng et al. | |
| 9,424,866 | B1 * | 8/2016 | Cao ........................ | G11B 7/124 |
| 9,466,320 | B1 | 10/2016 | Staffaroni et al. | |
| 9,472,220 | B1 * | 10/2016 | Burgos ................. | G11B 5/6088 |
| 9,530,445 | B1 * | 12/2016 | Grobis ................. | G11B 5/7379 |

(Continued)

OTHER PUBLICATIONS

U.S. Office Action, U.S. Appl. No. 15/011,892, Applicant: Staffaroni et al., dated Dec. 14, 2016, 12 pages.

(Continued)

*Primary Examiner* — Allen T Cao
(74) *Attorney, Agent, or Firm* — Saile Ackerman LLC; Stephen B. Ackerman

(57) ABSTRACT

A near field transducer (NFT) is formed between a waveguide and main pole at an air bearing surface (ABS). The NFT includes a rod-like front portion (PG1) and a substantially triangular shaped back portion (PG2) with a dielectric separation layer therebetween. PG1 is formed on a first dielectric layer with thickness t1 and refractive index (RI1) while PG2 is on a second dielectric layer with thickness t2 and having refractive index (RI2) where t1>t2, and RI1>RI2 while PG1 has a tapered backside at angle 45+15 degrees to promote efficient energy transfer from PG2 to PG1 and reduce NFT heating. A dielectric layer that induces poor adhesion with PG1 may be inserted between below PG1 at the ABS to cause Au recession to occur at the PG1 leading side thereby preventing voids at the PG1 trailing side and ensuring good ADC performance.

33 Claims, 12 Drawing Sheets

(56) References Cited

U.S. PATENT DOCUMENTS

| | | |
|---|---|---|
| 10,043,542 B2 | 8/2018 | Shimazawa et al. |
| 10,490,215 B1 | 11/2019 | Chen et al. |
| 2011/0205863 A1 | 8/2011 | Zhao et al. |
| 2016/0379677 A1* | 12/2016 | Van Orden ............ G02B 6/105 369/13.23 |
| 2017/0186451 A1 | 6/2017 | Bian et al. |
| 2017/0221505 A1* | 8/2017 | Staffaroni ............ G11B 5/6088 |
| 2019/0198053 A1 | 6/2019 | Krichevsky et al. |

OTHER PUBLICATIONS

U.S. Notice of Allowance, U.S. Appl. No. 15/011,892, Applicant: Staffaroni et al., dated Mar. 29, 2017, 10 pages.

U.S. Office Action, U.S. Appl. No. 15/011,892, Applicant: Staffaroni et al., dated Aug. 7, 2017, 10 pages.

U.S. Office Action, U.S. Appl. No. 15/011,892, Applicant: Staffaroni et al., dated Jan. 5, 2018, 7 pages.

U.S. Office Action, U.S. Appl. No. 15/011,892, Applicant: Staffaroni et al., dated Aug. 27, 2018, 6 pages.

U.S. Notice of Allowance, U.S. Appl. No. 15/011,892, Applicant: Staffaroni et al., dated Dec. 21, 2018, 5 pages.

Barnes, W., et al., Surface plasmon subwavelength optics, Nature, vol. 424, pp. 824-830, Aug. 14, 2003, https://doi.org/10.1038/nature01937.

Challener, W. A., et al. Heat-assisted magnetic recording by a near-field transducer with efficient optical energy transfer, Nature Photon, vol. 3, pp. 220-224, Apr. 2009, https://doi.org/10.1038/nphoton.2009.26.

Wang Xiaobin, et al., HAMR Recording Limitations and Extendibilty, IEEE Transactions on Magnetics, vol. 49, No. 2, Feb. 2013, pp. 686-692.

Cechal Jan, et al., Detachment Limited Kinetics of Gold Diffusion through Ultrathin Oxide Layers, J. Phys. Chem. C 2014, pp. 17549-17555, Publication Date: Jul. 10, 2014, https://doi.org/10.1021/jp5031703.

\* cited by examiner

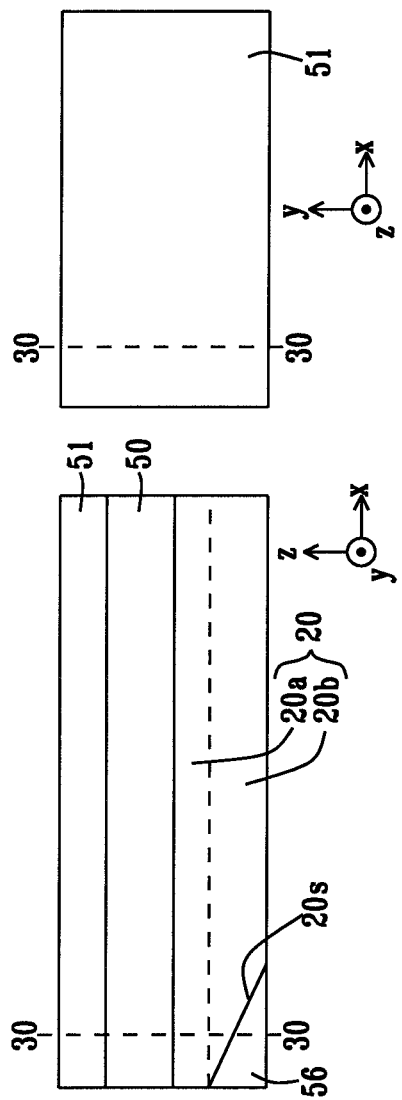
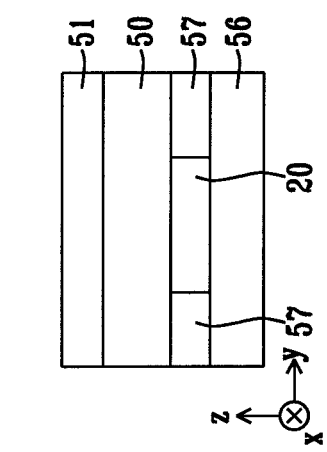
FIG. 10A  FIG. 10B  FIG. 10C
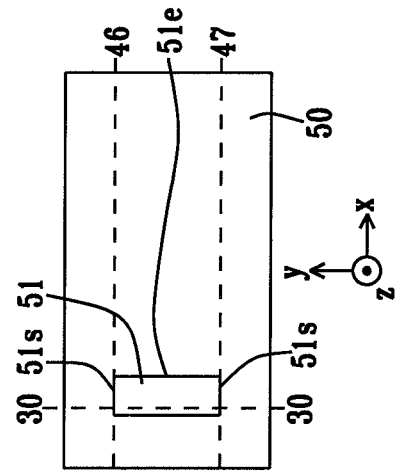
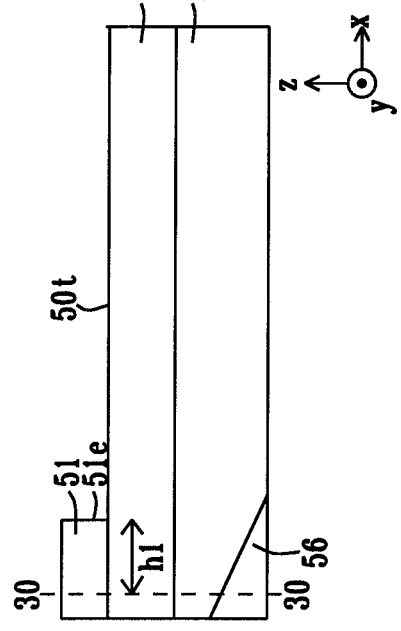
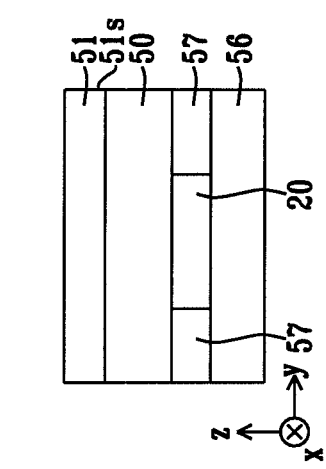
FIG. 11A  FIG. 11B  FIG. 11C

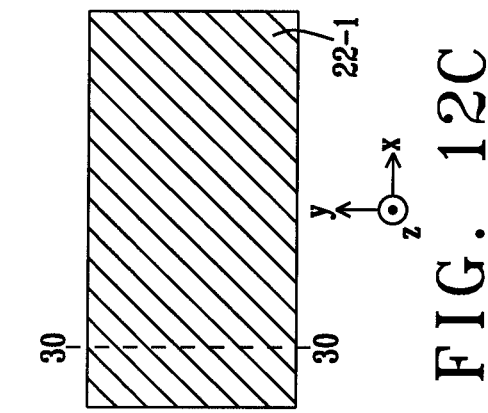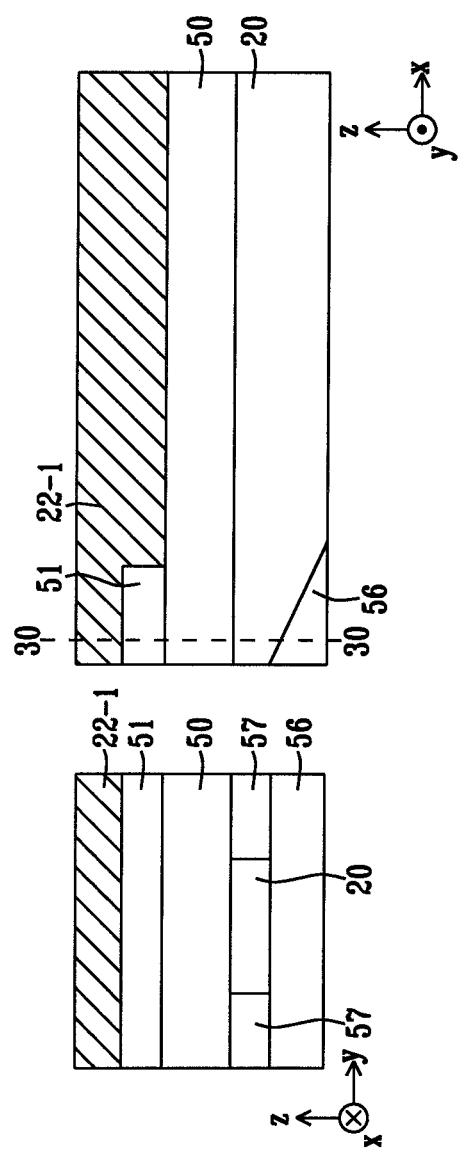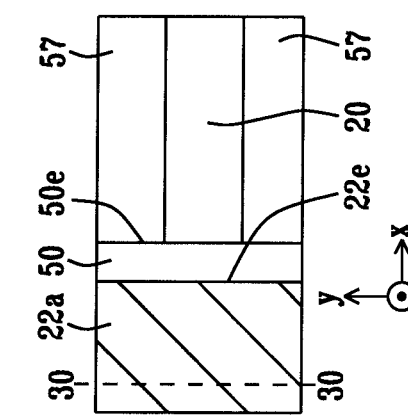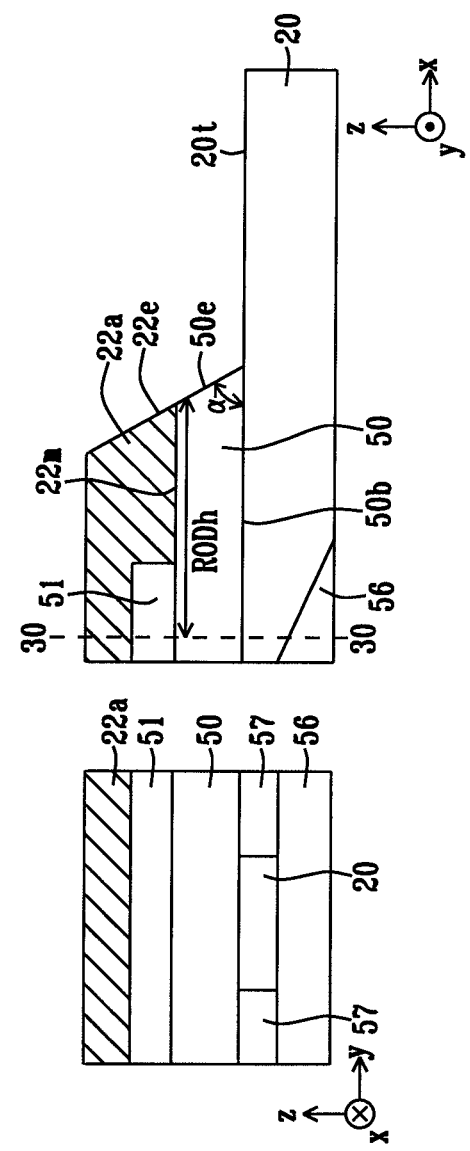

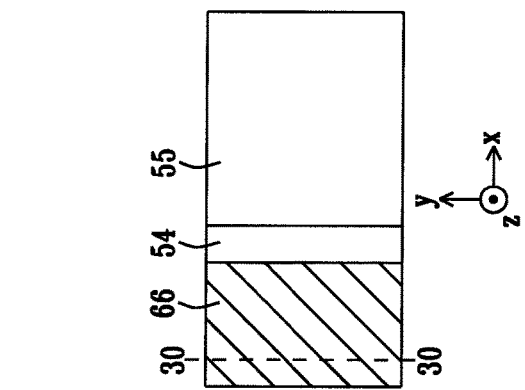 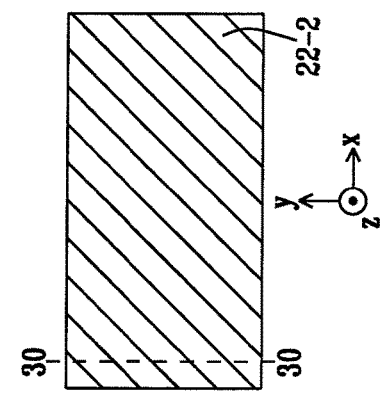
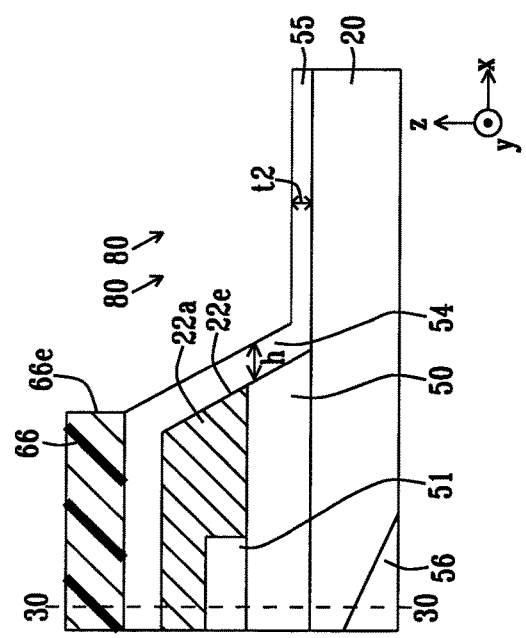 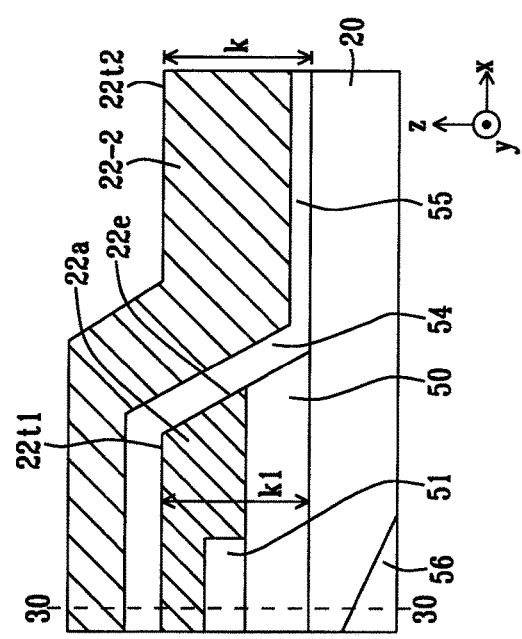
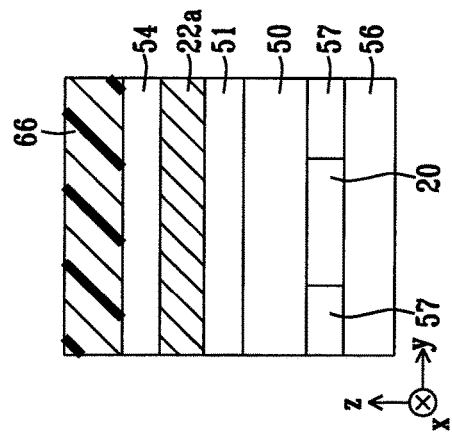 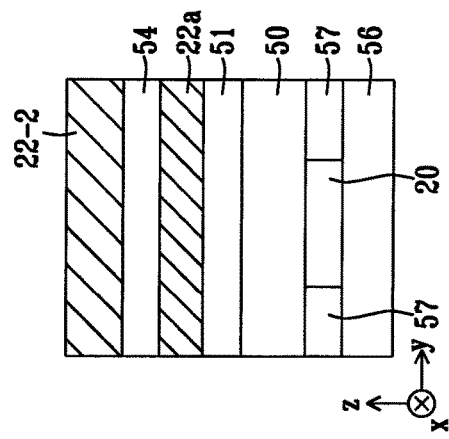

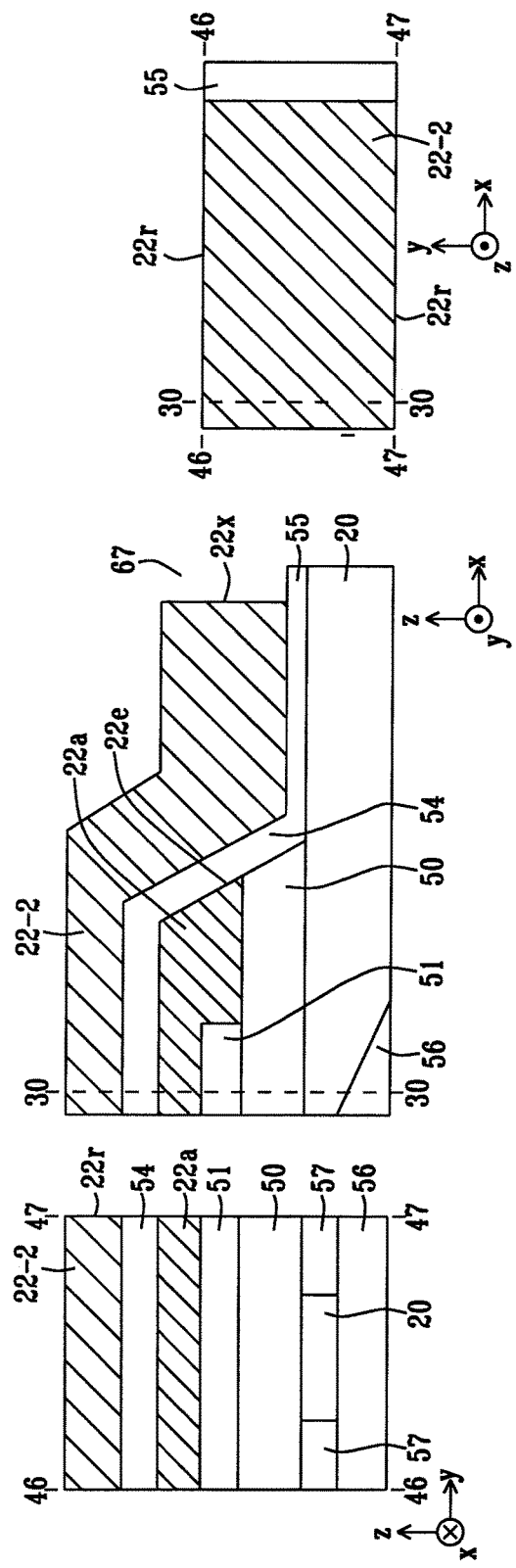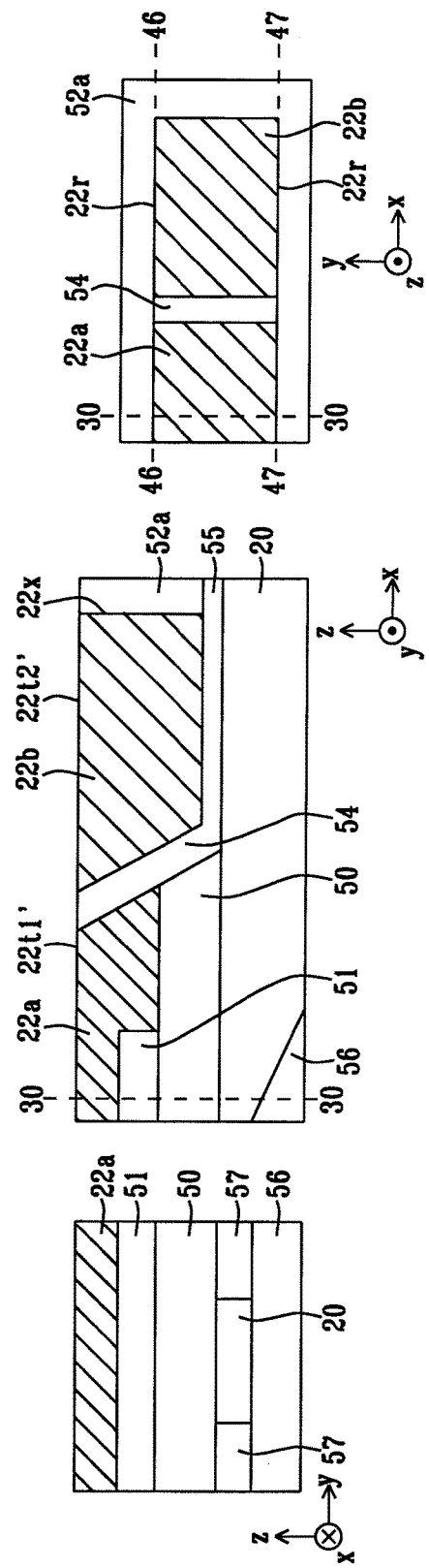

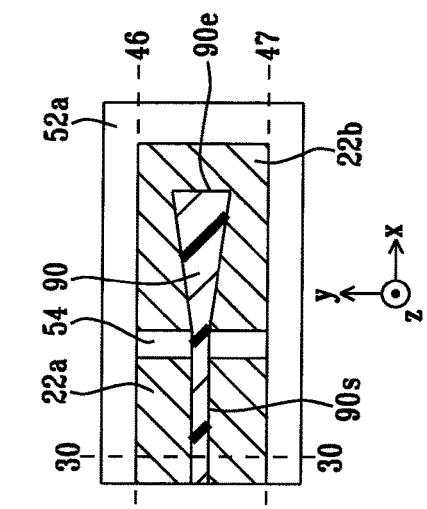
FIG. 18C
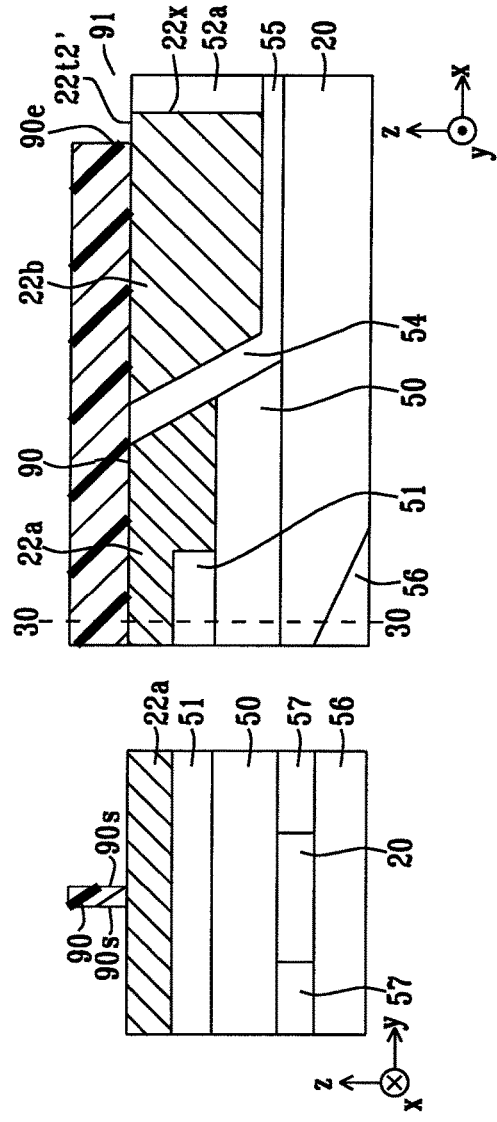
FIG. 18B
FIG. 18A
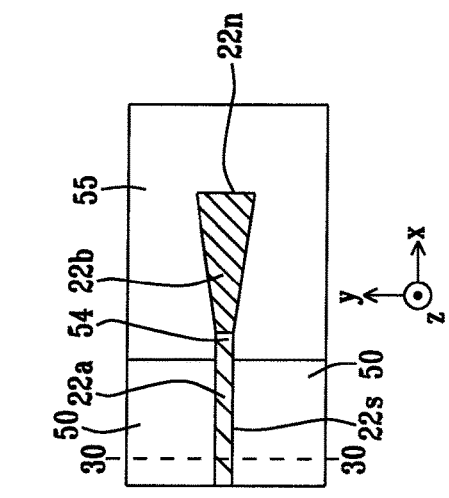
FIG. 19C
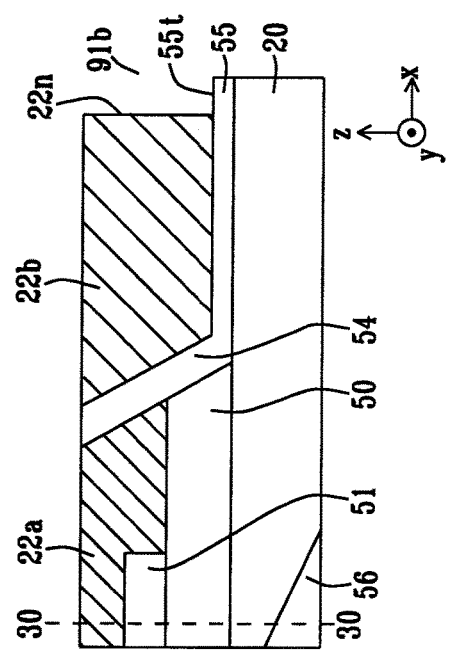
FIG. 19B
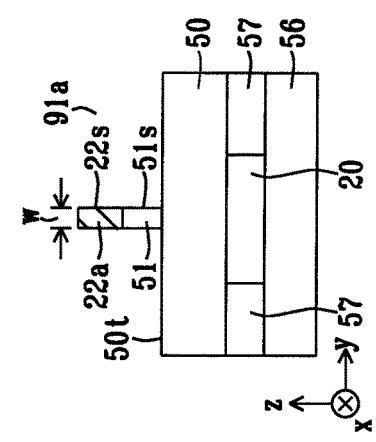
FIG. 19A

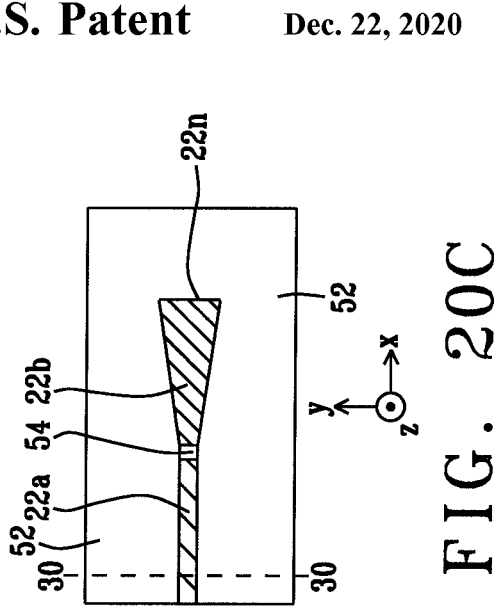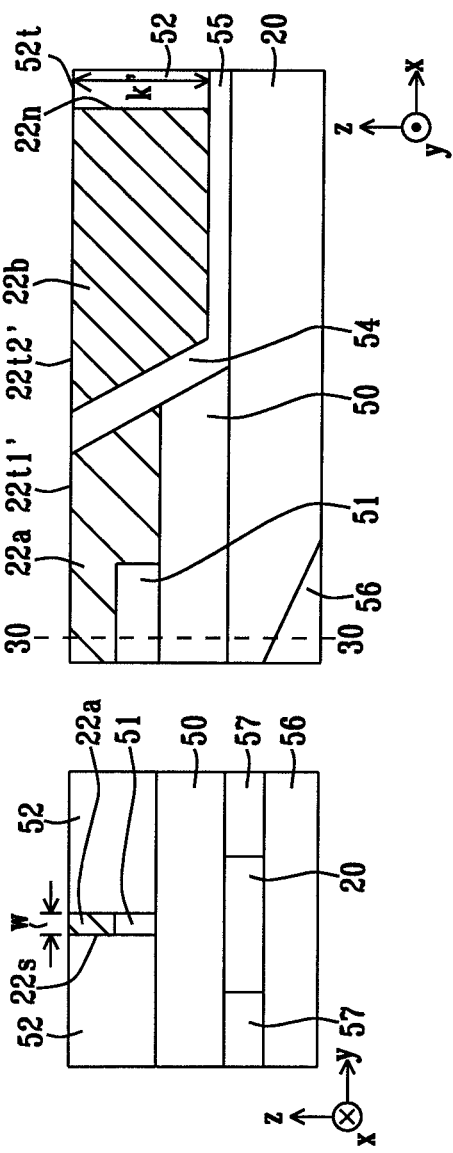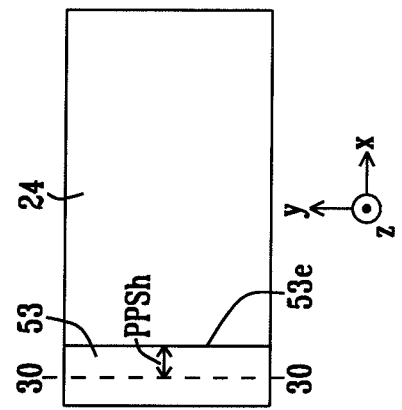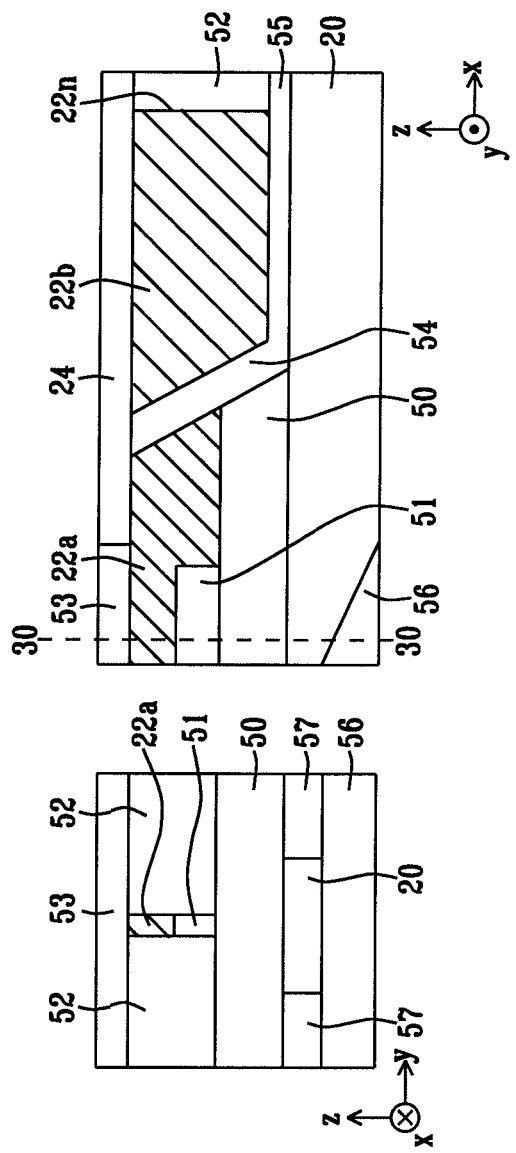

NEAR-FIELD TRANSDUCER WITH AU NANO ROD

RELATED PATENT APPLICATION

This application is related to the following: U.S. Pat. No. 10,262,683; assigned to a common assignee and herein incorporated by reference in its entirety.

TECHNICAL FIELD

The present disclosure relates to a thermally assisted magnetic recording (TAMR) device, and in particular to a near-field transducer (NFT) also known as a plasmon generator (PG) wherein a front portion called a peg has a front side at the air bearing surface (ABS), and a PG back portion is separated from the front portion by a dielectric layer sloped at an angle of 45±15 degrees to reduce temperature rise, and a second dielectric layer at the ABS and below the front Au peg portion is used to cause asymmetrical Au PG recession that avoids Au trailing side recession thereby optimizing area density capability (ADC).

BACKGROUND

To further increase the magnetic recording density of hard disk drive (HDD) systems, there is an increasing demand to improve the performance of thin film magnetic heads. A perpendicular magnetic recording (PMR) head that combines a single pole writer with a tunneling magnetoresistive (TMR) reader provides a high write field and large read-back signal to provide enhanced ADC. However, increasing the magnetic recording areal density requires smaller grain sizes in the magnetic recording media, which in turn reduces storage lifetime. In order to maintain durable storage lifetime, media thermal stability has to be increased. Consequently, the magnetic field generated by the writer's main pole as well as the current from the coil around the main pole may not be strong enough to switch the magnetic recording bits for data recording.

To solve this magnetic recording dilemma, TAMR was introduced. TAMR involves raising the temperature of a small region of the magnetic medium to near its Curie temperature where its coercivity and anisotropy are significantly reduced and magnetic writing becomes easier to achieve even with weak write fields characteristic of small write heads in high recording density schemes. In TAMR, optical power from a light source is converted into localized heating in a recording medium during a write process to temporarily reduce the field needed to switch the magnetizations of the medium grains. The near-field light is generated from plasmons excited by irradiation with light through a metal layer. Light typically originates from a laser diode mounted on the backside of a slider and may be in a transverse electric (TE) or transverse magnetic (TM) mode. A beam is directed through a dielectric waveguide to a metal layer that is often called a peg because of a metallic nanostructure. The peg is also known as a plasmon generator (PG) or NFT, and generates near-field light efficiently by exciting surface plasmon (SP) or surface wave of free electrons bound at the metal-dielectric interface. Peg structure and geometry are engineered to enable efficient energy transfer from the waveguide to peg, to excite local surface plasmon resonance, and to utilize a so-called lightning rod effect to further improve field confinement. Note that peg down-track and cross-track dimensions at the ABS largely dictate optical power intensity on the magnetic recording layer.

U.S. Pat. No. 8,000,178 discloses a TAMR device where there is surface plasmon coupling between a TaOx waveguide and PG made of Au. This design has a significant challenge in terms of reliability since Au has a well known softening temperature of about 100° C., which is exceeded in the PG during a write operation. Generally, Au films have a density only about 90% in the bulk state, and when the softening temperature is exceeded, vacancies are discharged to the outside thereby shrinking the film. Accordingly, the front of the PG proximate to the ABS has a recession and the resulting void greatly degrades recording characteristics. For example, a gold PG with 95% density and a length (height orthogonal to ABS) of 1000 nm will form a 50 nm recession because of the vacancy discharge. However, it is known that a 5 nm recession will greatly reduce ADC performance. As disclosed in U.S. Patent application 2011/0205863, addition of dopant such as Cu, Rh, or Ru to Au will help suppress recession and improve reliability, but when the amount of dopant is increased to an extent to achieve sufficient robustness, there is a significant loss in surface plasmon resonance that degrades ADC leading to a trade-off in reliability vs. performance.

In related U.S. Pat. No. 10,262,863, a self-aligned Au—Rh PG is disclosed to realize acceptable optical properties and reliability. However, Rh is susceptible to oxidation that leads to a degradation in plasmon efficiency and an undesirable increase in PG temperature. Thus, ADC performance for a Au—Rh bilayer PG is not as good as a gold peg, which narrows the extendibility of TAMR technology.

U.S. Pat. No. 10,043,542 describes a PG wherein Au is separated from Ir, Co, or Rh. Since the Au PG proximate to the ABS is isolated, Au volume is minimized and the amount of recess is reduced for better reliability. However near-field light spreads in a metal separation layer to give deteriorated ADC. Although replacing the metal separation layer with a dielectric material eliminates ADC loss, there is difficulty in dissipating heat in the Au PG tip. As a result, there is an extreme PG temperature rise that causes Au in the front portion to diffuse through the dielectric layer and into a PG back portion. J. Cechal et. al in "Detachment Limited Kinetics of Gold Diffusion through Ultrathin Oxide Layers", J. Phys. Chem. C2014, 118, 31 17549-17555 suggests that Au atoms separate from Au clusters and pass through an adjoining dielectric film when the Au temperature exceeds 450° C.

Currently, there is no TAMR NFT that exhibits both of thermal stability (reliability) and ADC performance required for a successful commercial product. Therefore, a new NFT structure is needed where PG recession is substantially minimized while allowing for efficient energy transfer through the PG so that acceptable ADC performance and reliability are achieved simultaneously.

SUMMARY

One objective of the present disclosure is to provide a PG in a TAMR device where temperature rise is minimized even when a dielectric separation layer is used between PG front and back portions thereby improving reliability.

A second objective of the present disclosure is to provide a TAMR device according to the first objective that also substantially reduces PG recession caused by heating thereby maintaining ADC performance.

A third objective of the present disclosure is to provide a method of forming the PG according to the second objective and where the TAMR device is fabricated using existing materials and processes.

These objectives are realized according to a first embodiment of the present disclosure wherein a write head in a combined read-write head has a PG formed at the ABS and between a main pole (MP) and a waveguide. The PG has a front portion with a front side at the ABS, and a sloped backside having a bottom end at a first height (RODh) from the ABS where RODh is preferably from 60 nm to 300 nm, and is greater than a height of the top end. The sloped backside of the PG front portion forms an angle α of 45±15 degrees with respect to the PG front portion bottom surface, and is important for efficient transfer of plasmon energy from the PG back portion to PG front portion. The PG front portion has a rectangular shaped front side, and two sides that are equidistant from a center plane, and from a top-down view has a rod-like shape with a lengthwise dimension oriented orthogonal to the ABS. The PG back portion has a sloped front side essentially parallel to the PG front portion backside, and is separated therefrom by a dielectric separation (DS) layer made of AlOx or SiOx and having a thickness of 10 nm to 30 nm. From a top-down view, the PG back portion has two sides separated by increasing distance in a cross-track direction with increasing distance from the DS layer, and terminating at a backside that is parallel to the ABS. The PG is made of Au or an alloy thereof. The aforementioned features of the PG and DS layer, as well as the first and second dielectric layers and PPS described below are largely responsible for minimizing PG temperature rise and recession while maximizing ADC performance.

Preferably, the top surfaces of the PG front and back portions are coplanar. However, the PG front portion has a lesser thickness in a down-track direction than that of the PG back portion. Moreover, a first dielectric layer in front of the DS layer and having a thickness t1 separates the PG front portion from the waveguide while a second dielectric layer behind the DS layer has a thickness t2 between the PG back portion and waveguide (WG) where t1>t2. A third dielectric layer that is a peg-pole spacer (PPS) between the MP and PG front portion has a front side at the ABS and extends to a height PPSh where PPSh<RODh. The PPS backside adjoins a front side of a diffusion barrier that extends over the DS layer and PG back portion. The diffusion barrier is typically Ru, Rh, or Ir and prevents inter-diffusion between the PG and MP.

The WG is a high index dielectric material such as TaOx and has an upper WG portion with a front side at the ABS. However, a lower WG portion has a tapered front side that is separated from the ABS by a low index fourth dielectric layer that serves as a blocker to suppress waveguide modes in the lower WG portion. The blocker prevents uncoupled waveguide light in the lower WG portion from reaching the magnetic medium and thereby avoids degraded thermal confinement of the heating spot on the media. First through third dielectric layers mentioned previously are also made of a low index dielectric material such as SiOx. In some embodiments, a heat sink that is Ru, Rh, Ir, Au, or Cu is formed between the diffusion barrier and MP.

According to a second embodiment, the features of the first embodiment are retained and a fifth dielectric layer is inserted between the first dielectric layer and PG front portion and extends from the ABS to a second height (h2) that is preferably less than PPSh. The fifth dielectric layer is used to intentionally degrade adhesion of the PG front portion so that an asymmetrical recession is formed at elevated temperatures when Au vacancies concentrate on the fifth dielectric layer to form a triangular void shape proximate to the ABS at the PG leading side. As a result, Au recession is prevented on the trailing side of the PG front portion, which is important for ADC performance and better reliability.

The present disclosure also encompasses a method of fabricating a TAMR head according to the second embodiment. A series of steps are described with respect to an ABS view, a down-track cross-sectional view at a center plane that bisects the PG, and from a top-down view.

BRIEF DESCRIPTION OF THE DRAWINGS

FIGS. 10A-21A depict ABS views of various steps during a fabrication process to form the TAMR head in FIG. 6A according to an embodiment of the present disclosure.

FIGS. 10B-21B depict down-track cross-sectional views of various steps during the fabrication process to form the TAMR head in FIG. 6B according to an embodiment of the present disclosure.

FIGS. 10C-21C depict top-down views of various steps during the fabrication process to form the TAMR head in FIGS. 6A-6B according to an embodiment of the present disclosure.

DETAILED DESCRIPTION

The present disclosure is a TAMR device wherein a PG and surrounding dielectric layers are designed for efficient plasmon energy transfer from the PG to ABS, and where PG temperature rise is minimized for improved reliability, and PG recession at the PG trailing side at the ABS is avoided to optimize ADC performance. In all drawings, the y-axis is the cross-track direction, the z-axis is the down-track direction, and the x-axis is a direction orthogonal to the ABS and towards a back end of the device. A top surface indicates a side of a layer that faces away from a substrate while a front end or front side relates to a surface of a layer at or facing the ABS. A backside of a layer faces away from the ABS. A second layer said to have a position "behind" a first layer means that the second layer is a greater distance from the ABS than the first layer. A "high index" material is defined as a material having a refractive index greater than 2.0 while a "low index" relates to a refractive index less than about 1.6.

Figure 1:
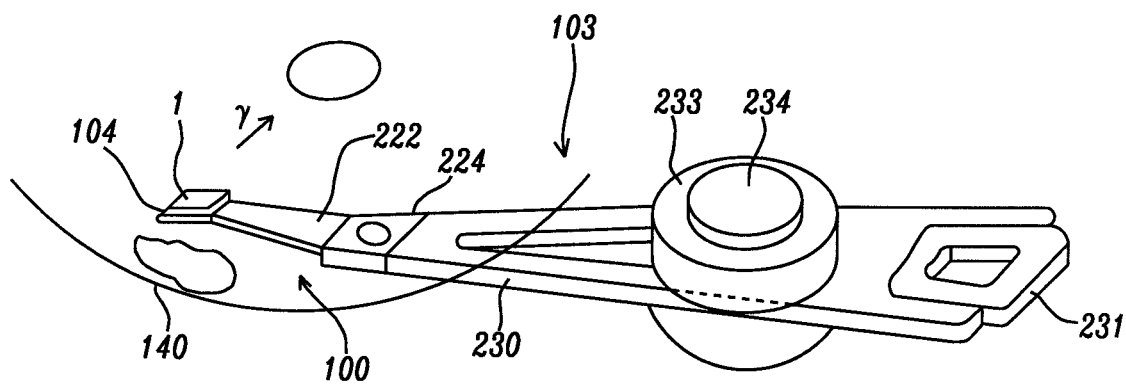
FIG. 1 is a perspective view of a head arm assembly of the present disclosure.

Referring to FIG. 1, a head gimbal assembly (HGA) 100 includes a magnetic recording head 1 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 1 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
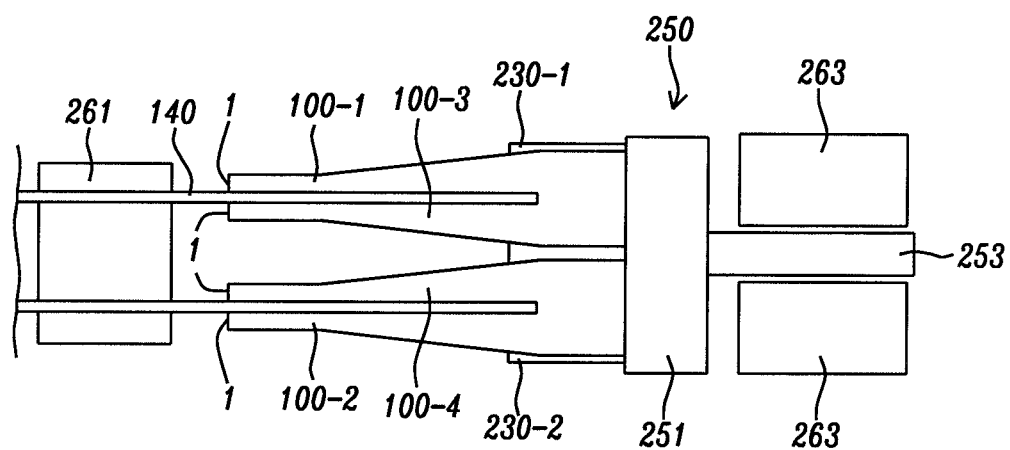
FIG. 2 is side view of a head stack assembly of the present disclosure.

Next, a side view of a head stack assembly (FIG. 2) and a plan view of a magnetic recording apparatus (FIG. 3) wherein the magnetic recording head 1 is incorporated are depicted. The head stack assembly 250 is a member to which a plurality of HGAs (HGA 100-1 and HGA 100-2 are at outer positions while HGA 100-3 and HGA 100-4 are at inner positions in the illustration) is mounted to arms 230-1, 230-2, respectively, on carriage 251. A HGA is mounted on each arm at intervals so as to be aligned in the perpendicular direction (orthogonal to magnetic medium 140). The coil portion (231 in FIG. 1) of the voice coil motor is mounted at the opposite side of each arm in carriage 251. The voice coil motor has a permanent magnet 263 arranged at an opposite position across the coil 231.

Figure 3:
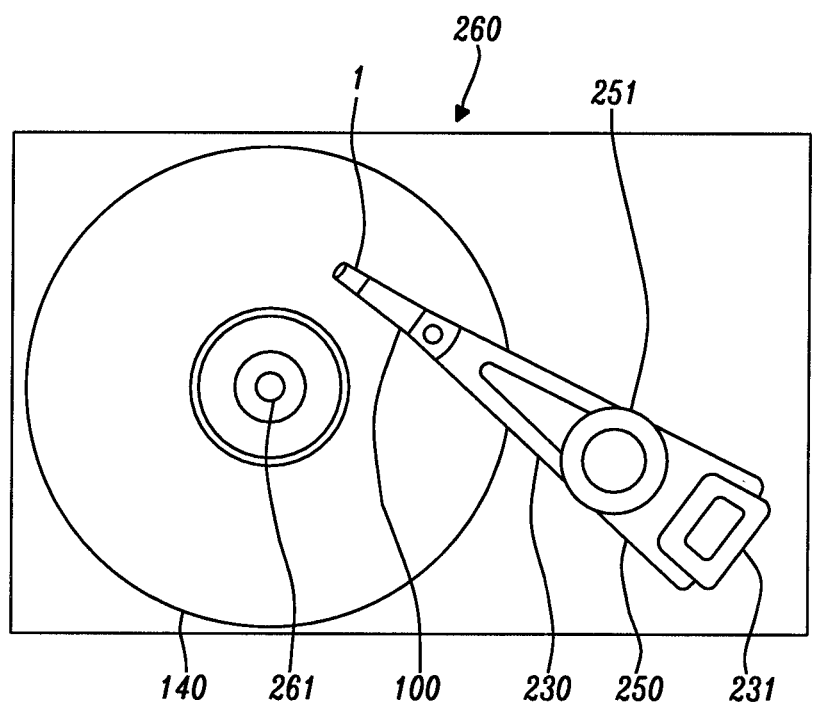
FIG. 3 is a plan view of a magnetic recording apparatus of the present disclosure.

With reference to FIG. 3, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 1 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 4:
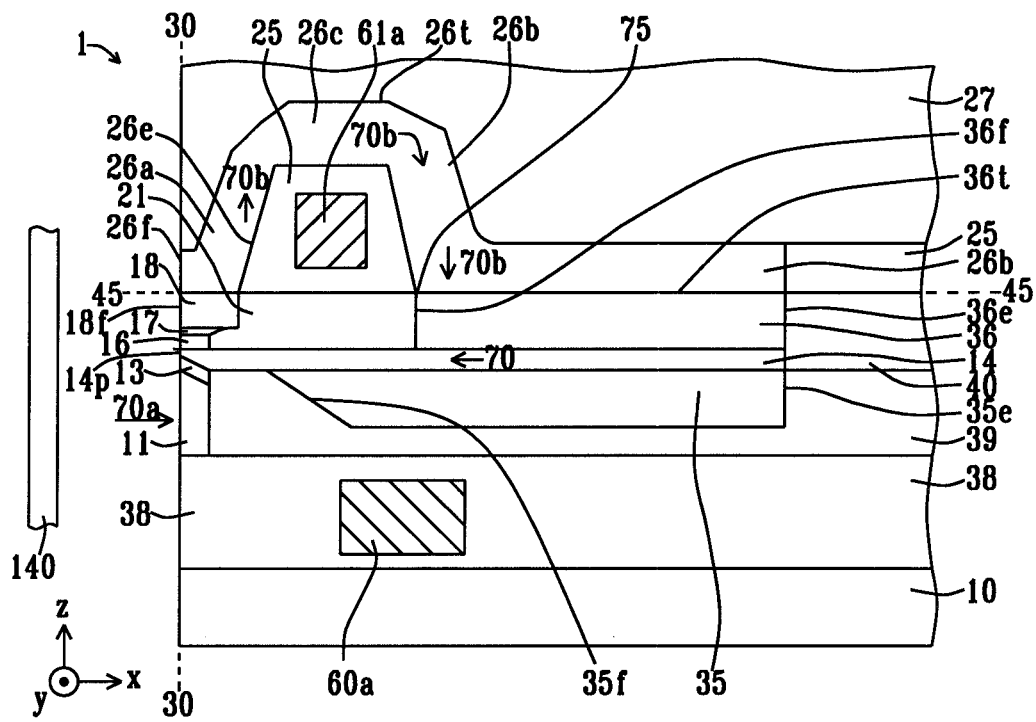
FIG. 4 is a down-track cross-sectional view of a write head portion of a combined read-write head according to an embodiment of the present disclosure.

Referring to FIG. 4, magnetic recording head 1 comprises a combined read-write head. However, only the write head portion is shown. The down-track cross-sectional view is taken along a center plane (44-44 in FIG. 5A) formed orthogonal to the ABS 30-30, and that bisects the main pole layer 14. The combined read-write head is formed on a substrate (not shown) that may be comprised of AlTiC (alumina+TiC). The substrate is typically part of a slider formed in an array of sliders on a wafer. After the combined read-write head is fabricated, the wafer is sliced to form rows of sliders. Each row is typically lapped to afford an ABS before dicing to fabricate individual sliders that are used in a magnetic recording device.

The present disclosure anticipates that various configurations of a write head may be employed. In the exemplary embodiment, magnetic flux 70 in main pole (MP) layer 14 is generated with flowing a write current called $1_w$ (not shown) through bucking coil 60a and driving coil 61a that are below and above the MP layer, respectively, and are connected by interconnect (not shown). Magnetic flux (write field) 70 exits the MP layer at pole tip 14p at the ABS 30-30 and is used to write a plurality of bits on magnetic media 140. Write gap 16 and leading gap 13 contact top and bottom MP surfaces, respectively, at the ABS. Magnetic flux (return field) 70b returns to the MP through a trailing loop comprised of trailing shield 17, write shield (WS) 18 with front side 18f at the ABS, an uppermost (PP3) trailing shield (TS) 26a-26c connecting the WS to the top yoke, and top yoke (TY) 36. In the exemplary embodiment, the PP3 TS front portion 26a has a front side 26f at the ABS, but in other embodiments the front side may be recessed from the ABS. Center PP3 TS portion 26c connects the PP3 TS front portion to PP3 TS back portion 26b that contacts the TY top surface 36t behind the driving coil. TY front side 36f is typically below point 80 where a front side of PP3 TS back portion contacts the TY. The WS and TY are separated with dielectric layer 21, and each has a top surface at plane 45-45. Insulation layer 25 surrounds the driving coil and is formed on dielectric layer 21. Dielectric layer 40 adjoins TY backside 36e and a MP backside. A protection layer 27 covers the PP3 shield and is made of an insulating material such as alumina.

In the exemplary embodiment that features a non-double write shield (nDWS) scheme, there is a leading return loop for magnetic flux 70a that terminates at leading shield 11. In an alternative embodiment (not shown), there is a leading shield connector and S2 connector (S2C) in dielectric layer 38 between the ABS 30-30 and bucking coil 60a, a return path (RTP) in dielectric layer 10, and a back gap connection (BGC) formed between the RTP and bottom yoke 35 that provide a continuous magnetic connection for magnetic flux 70a to return to MP 14. The bottom yoke 35 is formed in dielectric layer 39, and has a tapered front side 35f and a backside 35e. Dielectric layers 10, 13, 16, 21, 25, 27, and 38-40 are employed as insulation layers around magnetic and electrical components.

Figure 5A:
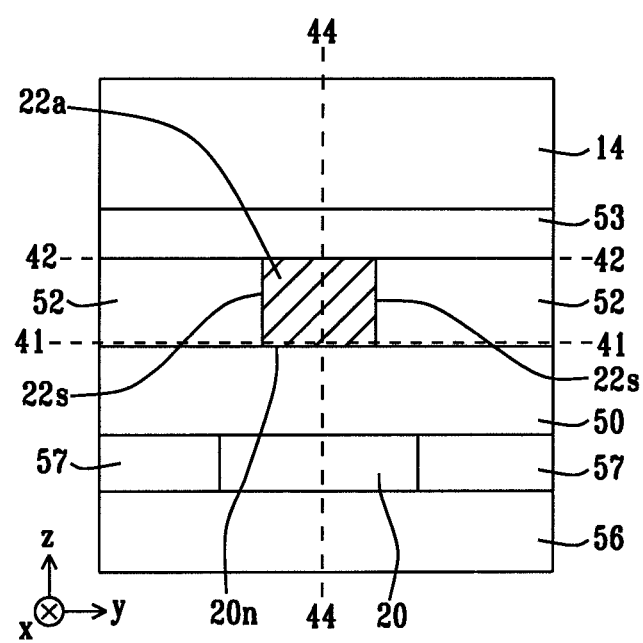
FIG. 5A is an ABS view of a TAMR head wherein a NFT (PG) is formed between a main pole and a waveguide, and is surrounded with a plurality of dielectric layers according to an embodiment of the present disclosure.

Referring to FIG. 5A, a first embodiment of the present disclosure is shown from an ABS view. PG front portion 22a, hereinafter referred to as PG 22a, is formed between MP 14 and waveguide (WG) 20, and has sides 22s formed equidistant from center plane 44-44 that is orthogonal to the ABS. Note that only an upper portion of the WG is visible from this view while the lower portion is behind dielectric layer 56 that is known as a blocker to prevent uncoupled WG modes from reaching the ABS and undesirably heating the magnetic medium. Plane 41-41 is orthogonal to both of the ABS and center plane, and is proximate to bottom surface 22m of PG 22a. Plane 42-42 is parallel to plane 41-41 and includes a top surface of PG 22a and the PG back portion (shown in FIG. 5B) and hereinafter referred to as PG 22b. Peg-pole spacer (PPS) 53 is a dielectric material that contacts the top surface of PG 22a and has a thickness from 5 nm to 30 nm. Dielectric layer 52 adjoins PG sides 22s, and the bottom surface of PG 22a is formed on dielectric layer 50. The WG is preferably a high index material such as TaOx while dielectric layers 50, 52, 53, and 56, and WG cladding layer 57 are low index materials that are silicon oxide or aluminum oxide, for example.

Figure 5B:
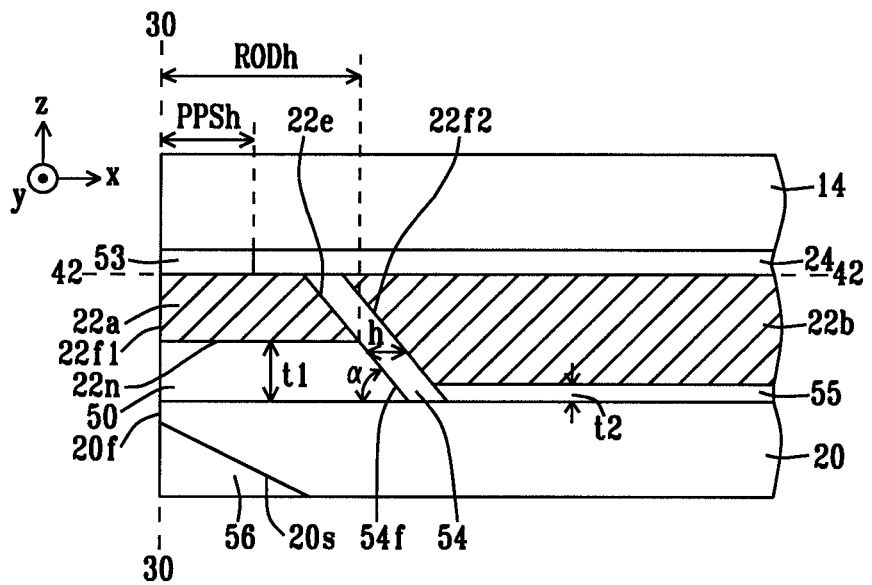
FIG. 5B is a down-track cross-sectional view of the TAMR head structure in FIG. 5A according to a first embodiment where a sloped dielectric separation layer adjoins a backside of the PG front portion and a front side of the PG back portion, and a diffusion barrier contacts a substantial portion of the PG top surface.

In FIG. 5B, a down-track cross-sectional view is illustrated at plane 44-44 in FIG. 5A. Blocker 56 has decreasing thickness with increasing distance (height) from ABS 30-30, and interfaces with tapered front side 20s of a lower portion of WG 20. Dielectric layer 50 is formed on the WG and has thickness t1. PG 22a has a front side 22f1 at the ABS and backside 22e that forms an angle α with bottom surface 22m where a is 45±15 degrees. A key feature is that a dielectric separation (DS) layer 54 with thickness (height) h of 10 nm to 30 nm in the x-axis direction, and made of a low index material, is used to separate PG 22a from PG 22b that has front side 22f2. Thus, the front side of PG 22b is essentially parallel to the backside 22e of PG 22a. The slope of the DS layer is employed to provide efficient plasmon energy transfer from PG 22b to PG 22a, and thickness h minimizes a temperature increase in the latter. PG 22b is formed on dielectric layer 55 having thickness t2, which in turn contacts a top surface of WG 20 behind the DS layer. Preferably, t1 is greater than t2, and dielectric layer 50 has a larger effective refractive index RI1 than RI2 of dielectric layer 55 to further promote efficient plasmon energy transfer from PG 22b to PG 22a. Another important feature is that a bottom end of backside 22e is a first height (RODh) of 60 nm to 300 nm from the ABS. Moreover, PPS 53 on PG 22a extends a second height (PPSh) from the ABS where PPSh is from 20 nm to 60 nm. Diffusion barrier 24 is made of Ru, Rh, or Ir, contacts a PPS backside at height PPSh, and is formed on a top surface of PG 22b and on a portion of PG 22a at a height>PPSh. The diffusion barrier prevents the diffusion of metals between MP 14 and PG 22b (and PG 22a).

Those skilled in the art will appreciate that a heat sink (not shown) may be formed on diffusion barrier 24 and below MP 14 to provide a means of heat dissipation. Heat sinks are well known in the art and are preferably made of a high thermal conductivity material such as Ru, Rh, Ir, Au, or Cu. The heat sink compensates for MP heating caused by proximity of the MP to PG 22a and PG 22b and the elevated peg temperature during write processes, and may extend a greater distance from the ABS 30-30 than a backside (not shown) of PG 22b.

Figure 6A:
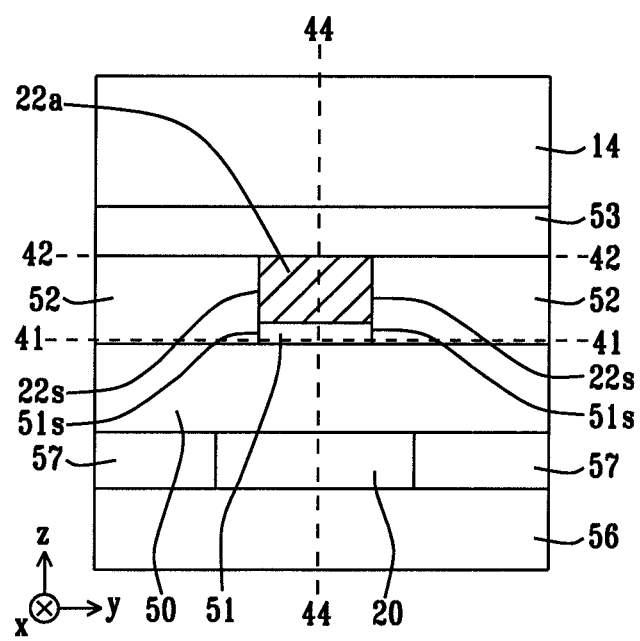
FIG. 6A is a modification of the TAMR head structure in FIG. 5A where a dielectric layer interfaces with a bottom surface of a PG front portion to intentionally degrade PG adhesion proximate to the ABS at the PG leading side thereby generating asymmetrical PG recession for enhanced PG performance.

Referring to FIG. 6A, a second embodiment of the present disclosure is depicted from an ABS view and retains the features of the first embodiment except a dielectric layer 51 is inserted between dielectric layer 50 and PG 22a. Dielectric layer 51 is a low index material and preferably has sides 51s adjoining dielectric layer 52, and that are coplanar with sides 22s of PG 22a. Dielectric layer 51 may be silicon oxide, for example, and is intentionally used to degrade adhesion of PG 22a to cause asymmetrical PG recession at the PG leading side described later with respect to FIGS. 9A-9D. As a result, PG trailing side recession at the ABS and proximate to PPS 53 is avoided, and reliability and ADC performance are enhanced.

Figure 6B:
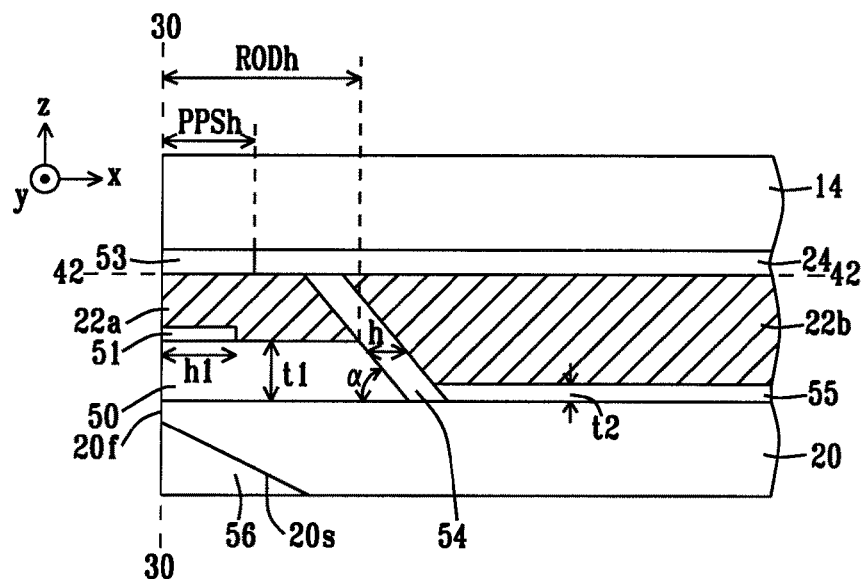
FIG. 6B is a down-track cross-sectional view of the TAMR head in FIG. 6A according to a second embodiment where a sloped separation layer adjoins a backside of the PG front portion and a front side of the PG back portion.

In FIG. 6B, a down-track cross-sectional view of the second embodiment is shown. Dielectric layer 51 extends from the ABS 30-30 to a height h1 that is from 10 nm to 100 nm. Although the exemplary embodiment depicts h1<PPSh, in other embodiments h1 may be greater than PPSh.

Figure 7A:
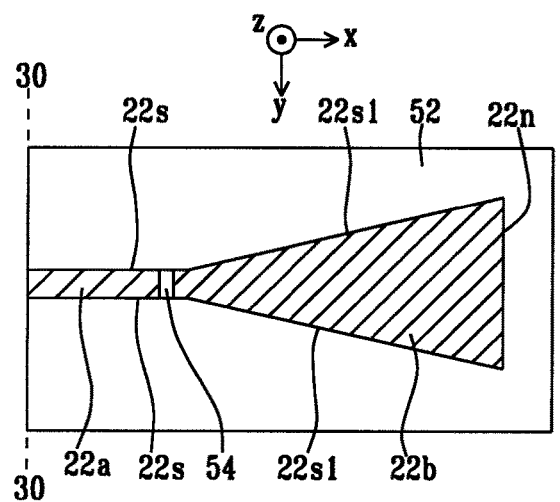
FIGS. 7A and 7B are top-down views at two planes that are orthogonal to the ABS and within the PG front portion and back portions according to the second embodiment of the present disclosure.

Referring to FIG. 7A, a top-down view of the PG is shown at plane 42-42 in FIG. 6B with overlying layers removed. PG 22a preferably has a rod-like shape with sides 22s aligned orthogonal to ABS 30-30 and terminating at DS layer 54. Behind the DS layer, PG 22b forms a substantially triangular shape with sides 22s1 having greater separation in the cross-track direction with increasing distance from the ABS until reaching backend 22n.

Figure 7B:
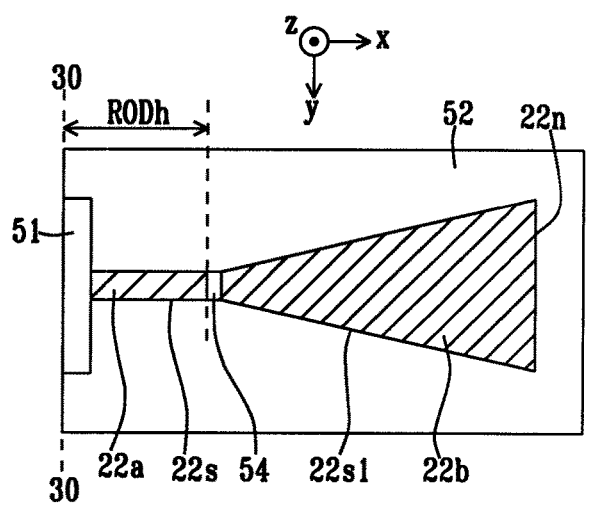

FIG. 7B is a top-down view of the PG at plane 41-41 in FIG. 6A with overlying layers removed. The same features are visible as in FIG. 7A except PG 22a adjoins the backside of dielectric layer 51 at height h1.

Figure 8:
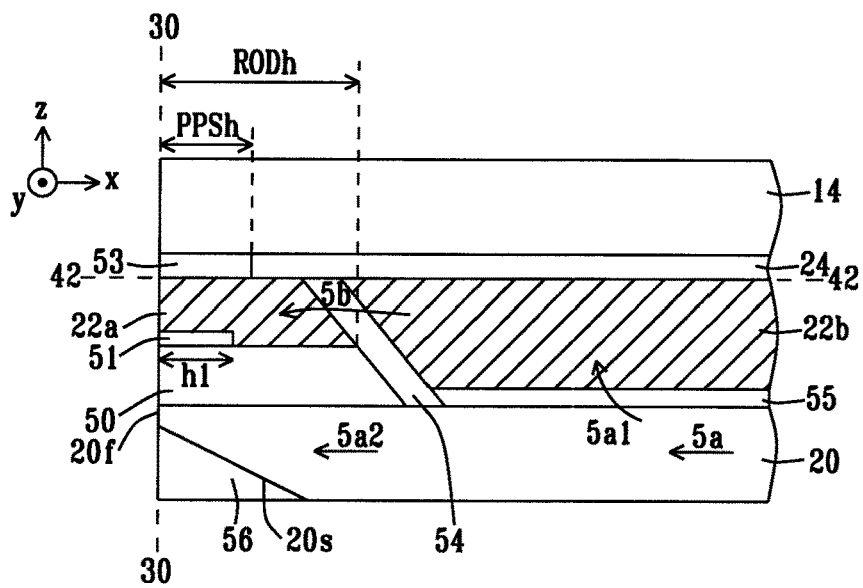
FIG. 8 is a down-track cross-sectional view of the TAMR head of the second embodiment that shows light from a laser diode is transmitted through a waveguide and a portion is coupled into a PG back portion, and generates plasmon energy which propagates through the PG front portion to the ABS.

Referring to FIG. 8, light 5a is generated by a laser diode (not shown) mounted on the back end of the slider on which the TAMR head is formed, and is propagated toward the ABS within waveguide 20. A substantial portion of light 5a1 is coupled to PG 22b in the form of a plasmonic resonance or surface plasmon mode 5b that continues to PG 22a, and then is coupled to a heating spot on a magnetic medium (not shown) proximate to the ABS 30-30 thereby facilitating a write process involving a magnetic bit proximate to the heating spot. The remaining waveguide light 5a2 is not coupled to the PG and continues to propagate toward the ABS. As mentioned earlier, blocker 56 is advantageously employed to reflect a significant portion of light 5a2 to minimize the intensity of uncoupled light from exiting waveguide front side 20f and undesirably heating portions of the magnetic medium outside the bit that is to be switched.

To demonstrate the advantages of the present disclosure compared with the prior art found in related U.S. Pat. No. 10,262,683, a simulation was carried out to compare various key performance parameters of the first embodiment and a TAMR device known to the inventors where the PG has a self-aligned Au/Rh bilayer structure. The results are shown in Table 1 below. For Embodiment 1, the parameters used are the following: t1=30 nm; t2=20 nm; and angle α=45 degrees. The laser light source provides a wavelength of 808 nm.

TABLE 1

| | | | Performance comparison of PG designs in a TAMR head | | | |
|---|---|---|---|---|---|---|
| | PG comp. | RODh (nm) | DT thermal grad. (° K/nm) | CT thermal grad. (° K/nm) | PG temp. rise (° K) | Opt. reflec. at PG (%) |
| Prior Art | Au/Rh | — | 7.15 | 8.76 | 251.7 | 2.06 |
| Emb. 1 | Au | 100 | 10.24 | 9.98 | 165.7 | 6.83 |
| Emb. 1 | Au | 200 | 10.93 | 10.64 | 150.2 | 0.79 |
| Emb. 1 | Au | 300 | 11.16 | 10.87 | 149.6 | 3.74 |

In the simulation, PPSh=30 nm, and values of 100 nm, 200 nm, and 300 nm were selected for RODh. With regard to suppressing Au recession, the shortest RODh is preferred. However, the higher reflection of light at the PG for RODh=100 nm will adversely affect the operation of the laser diode. Note that reflectivity is measured at the backside of the waveguide. As indicated in Table 1, Embodiment 1 exhibits better down-track (DT) and cross-track (CT) thermal gradients and reduced temperature rise compared with the prior art. The former is attributed to the fact that the PG is entirely made of Au while the head temperature rise is suppressed because of the dielectric layer thickness (h) and angle α described previously. The preferred RODh is around 200 nm since optical reflection increases at longer and shorter RODh. At RODh=200 nm, optical reflection, DT and CT thermal gradients, and PG temperature rise are all superior to the prior art design.

As RODh increases, Au recession at the ABS becomes undesirably larger. When Au in PG 22a has 95% density against the bulk state, a RODh=100 nm will result in 5 nm of PG recession that represents the upper limit in terms of ADC performance degradation. With RODh=200 nm, Au recession will double (worst case) and is not tolerable. In order to prevent an unacceptable recession, one must increase Au density in advance and consider using techniques such as laser annealing disclosed by K. Shimazawa et. al in U.S. Pat. No. 10,020,193.

Figure 9A:
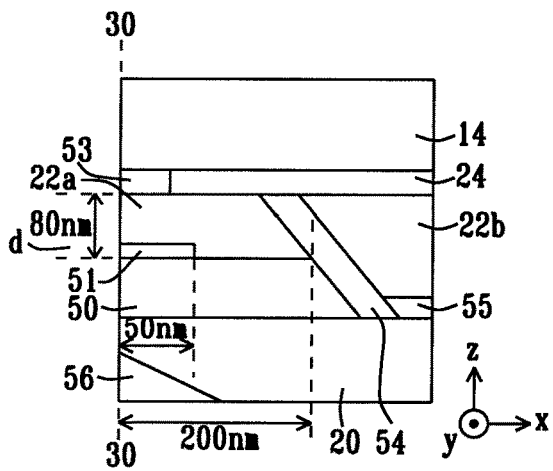
FIGS. 9A-9D are down-track cross-sectional views of the second embodiment that show formation of an asymmetrical recession at the leading side in the front PG portion as temperature is increased.
Figure 9B:
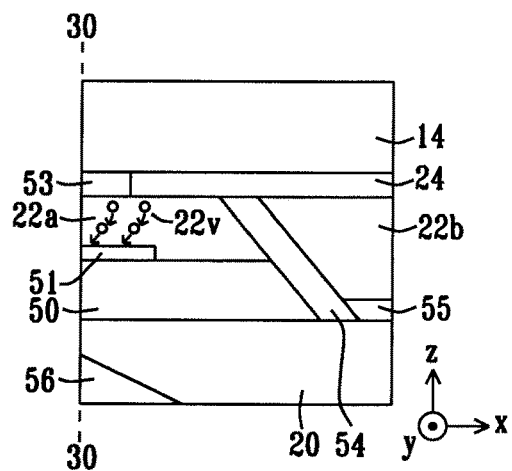
Figure 9C:
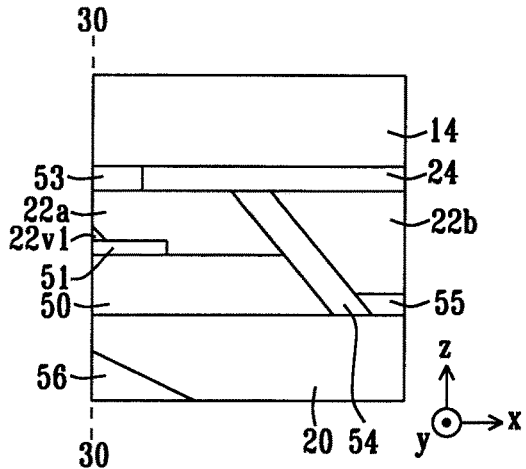
Figure 9D:
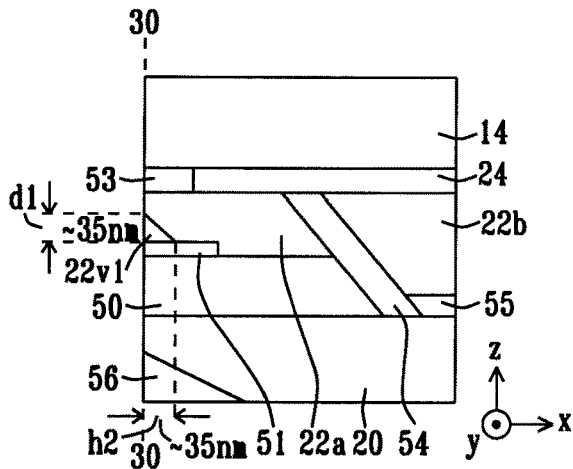

Embodiment 2 described earlier with respect to FIGS. 6A-6B offers an improvement over Embodiment 1 in that Au recession is substantially reduced even when RODh is larger than 200 nm and with an Au density of about 95%. FIGS. 9A-9D are a schematic representation of the controlled PG recession process according to the second embodiment. In this example, dielectric layer 51 is 10 nm thick. FIG. 9A shows the PG structure before any writing operation. In FIG. 9B, during head operation, PG 22a temperature exceeds 100° C. (Au softening temperature) and shrinks because of discharging vacancies 22v that concentrate proximate to the interface between dielectric layer 51 and PG 22a. As a result of the vacancy formation, a triangular shaped air void 22v1 (FIG. 9C) is formed at the leading side of PG 22a at the ABS 30-30 and on dielectric layer 51. When the density of Au reaches 100% due to the discharge of vacancies, the growth of void region 22v1 stops. In an example where RODh=200 nm, and PG 22a thickness d is 80 nm (FIG. 9A), the void region must grow to a thickness d1 of about 35 nm at the ABS in order for Au density to reach 100% (FIG. 9D). Note that the height h2 of the void 22v1 is also about 35 nm. Since there is no further recession growth, PG 22a has no recession at the trailing side proximate to PPS 53 thereby maintaining ADC performance and ensuring acceptable reliability.

The present disclosure also encompasses a method of forming the TAMR device with the PG disclosed in one of the aforementioned embodiments. Referring to FIGS. 10A-10C, the process begins at a point where a substrate comprised of waveguide (WG) 20 with a top portion 20a and bottom portion 20b, cladding layer 57 on each side of the WG, and dielectric layer (blocker) 56 in front of the bottom WG portion are provided according to well-known methods that are not described herein. The bottom WG portion has sloped front side 20s that interfaces with the blocker top surface. The blocker has decreasing thickness with increasing distance from the eventual ABS (plane 30-30). Typically, a chemical mechanical polish (CMP) step is used to generate a planar top surface on the upper portion of WG 20. First dielectric layer 50 and second dielectric layer 51 are sequentially deposited on the substrate including WG 20 and cladding layer 57 as shown from an ABS view, down-track cross-sectional view, and top-down view in FIG. 10A, FIG. 10B, and FIG. 10C, respectively. FIG. 10B is taken at center plane 44-44 described earlier with regard to FIG. 6A. In one preferred embodiment, the first dielectric layer is alumina that is deposited with an atomic layer deposition (ALD) method to provide a more uniform layer than other deposition methods, and dielectric layer 51 is $SiO_2$. Note that the eventual ABS indicated as plane 30-30 is not formed until the entire combined read-write head is completed and a back end lapping process is performed.

In FIGS. 11A-11C, a first photolithography process is performed wherein a photoresist layer (not shown) is patterned on dielectric layer 51. The patterned photoresist layer serves as a first etch mask while an ion beam etch (IBE) or reactive ion etch (RIE) is used to remove portions of dielectric layer 51 that are not protected by the first etch mask thereby forming backside 51e on the dielectric layer, and exposing portions of dielectric layer top surface 50t of the first dielectric layer. The step height between plane 30-30 and backside 51e is height h1 described previously with regard to FIG. 6B. Side portions of dielectric layer 51 are also removed to yield sides 51s at plane 46-46 and at plane 47-47, which are orthogonal to plane 30-30. Thereafter, the first etch mask is removed.

In the following step depicted in FIGS. 12A-12C, PG layer 22-1 is deposited on dielectric layer 51 and on exposed portions of dielectric layer top surface 50t. The PG material may be Au or an alloy thereof. In some embodiments, there may be an adhesion layer (not shown) made of Zr or SmOx, for example, formed on dielectric layer 51 and top surface 50t prior to depositing the PG layer.

Referring to FIG. 13A-13C, a second photoresist layer (not shown) is patterned on PG layer 22-1 to form a second etch mask. Next, a second IBE or RIE is performed to remove portions of the PG layer and dielectric layer 50 that are not protected by the second etch mask, and stopping on side cladding layers 57 and on WG top surface 20t. The etching angle is controlled to 45±15 degrees to provide front PG portion 22a with backside 22e, and backside 50e on first dielectric layer 50 where the aforementioned backsides are coplanar and form angle α with respect to PG bottom surface 22*m* and to first dielectric layer bottom surface 50*b*, respectively. Thus, this step is employed to provide height RODh of the bottom end of PG backside 22*e* from plane 30-30. Then, the second etch mask is removed with a conventional method.

Referring to FIGS. 14A-14C, dielectric separation (DS) layer 54 is deposited on PG 22*a*, dielectric layer backside 50*e*, and on exposed portions of WG 20 and cladding layer 57. According to one embodiment, a third etch mask 66 comprised of a patterned photoresist layer is formed on a top surface of PG 22*a* using a conventional technique. A backside 66*e* of the third etch mask is preferably aligned above the top end of PG backside 22*e*. An IBE is performed such that ion beams 80 are directed substantially parallel to PG backside 22*e* to selectively thin a portion of the DE separation layer above WG 20 thereby defining dielectric layer 55 with thickness t2. Meanwhile, the thickness h of the DS separation layer on backsides 50*e*, 22*e* is substantially maintained from 10 nm to 30 nm. The third etch mask is stripped after the etching process.

In FIGS. 15A-15C, a second PG layer 22-2 is deposited on DS layer 54 and on dielectric layer 55. In some embodiments the second PG layer is made of the same material as in PG 22*a*. However, the present disclosure also anticipates the second PG layer is made of a different material than PG 22*a*. For example, the former may be Au and the latter is a gold alloy, or vice versa. Preferably, the second PG layer has a sufficient thickness so that top surface 22*t*2 of the second PG layer has a thickness k above WG 20 that is greater or equal than the distance k1 of top surface 22*t*1 on PG 22*a* above the WG.

Referring to FIGS. 16A-16C, a fourth photoresist layer is patterned on second PG layer 22-2 to form a fourth etch mask (not shown). Thereafter, an IBE or RIE is performed to remove the so-called field portion of the second PG layer thereby generating second PG layer backside 22*x* and opening 67 behind the second PG layer backside. Note that opening 67 extends around the second PG layer and exposes the second PG layer sides 22*r* at planes 46-46 and 47-47. Then, the fourth etch mask is stripped.

FIGS. 17A-17C depict the next step in the fabrication sequence where dielectric layer 52*a* such as $SiO_2$ is deposited with a plasma enhanced chemical vapor deposition (PECVD) method in opening 67 and adjoins second PG layer backside 22*x* and sides 22*r* at plane 46-46 and at plane 47-47. Then, a second CMP process is employed to generate top surface 22*t*1' on PG 22*a* and form the back PG portion 22*b* having top surface 22*t*2' that is coplanar with top surface 22*t*1'.

Referring to FIGS. 18A-18C, a fifth photoresist pattern is formed on PG 22*a* and PG 22*b* and serves as a fifth etch mask 90 to define the final shape of the PG. The fifth etch mask has sides 90*s* and a backside 90*e* that form opening 91, which exposes portions of top surfaces 22*t*1' and 22*t*2', dielectric layer 52*a*, and DS layer 54. The portion of the fifth etch mask above PG 22*a* has a rod-like shape while the portion above PG 22*b* has a substantially triangular shape.

FIGS. 19A-19C depict the partially formed TAMR structure after an IBE step is applied to remove portions of PG 22*a*, PG 22*b*, and dielectric layer 52*a* not protected by the fifth etch mask. The etch stops on dielectric layer 50 and dielectric layer 55 and yields PG 22*a* and dielectric layer 51 each having a width w at the ABS 30-30 and with sidewalls 22*s* and sidewalls 51*s*, respectively, that are aligned with each other. PG 22*b* now has a backside 22*n* that defined by etch mask backside 90*e* in FIG. 18C. There is an opening 91*a* surrounding PG 22*a* and dielectric layer 51 that exposes dielectric layer top surface 50*t*, and an opening 91*b* surrounding PG 22*b* that exposes dielectric layer top surface 55*t*. The fifth etch mask is then removed.

Referring to FIGS. 20A-20C, a PECVD $SiO_2$ deposition is performed to form dielectric layer 52 in openings 91*a*, 91*b* and adjoining sidewalls 22*s* on PG 22*a* and sidewalls 22*s*1 on PG 22*b*, and contacting backside 22*n* on PG 22*b*. Another CMP process is employed to generate dielectric layer top surface 52*t* that is coplanar with top surfaces 22*t*1' and 22*t*2' on PG 22*a* and PG 22*b*, respectively. As a result, PG 22*b* has a thickness k' in the range of 40 nm to 120 nm.

Referring to FIGS. 21A-21C, PPS 53 comprised of $SiO_2$, for example, is deposited on PG 22*a*, PG 22*b*, and on dielectric layer 52. Thereafter, a sixth photoresist pattern is formed on PPS 53 and serves as a sixth etch mask (not shown). A backside of the sixth etch mask defines PP3 backside 53*e* and height PPSh of about 20 nm to 60 nm after an IBE or RIE process is performed to remove unprotected regions of the PPS. Next, diffusion barrier 24 is deposited in the opening generated from the etching step and adjoins the PP3 backside. The sixth etch mask is then stripped.

The remaining steps in the fabrication sequence to complete the write head including deposition of the MP on PPS 53 and on the diffusion barrier are well known in the art and are not described herein. A final step is to perform a lapping process that forms the ABS at plane 30-30.

The present disclosure has an advantage over the prior art in that it simultaneously provides a PG and surrounding dielectric layer structure that minimizes heating in PG 22*a* and substantially maintains ADC performance by avoiding Au recession proximate to the trailing side of PG 22*a* at the ABS.

While this disclosure has been particularly shown and described with reference to, the preferred embodiments thereof, it will be understood by those skilled in the art that various changes in form and details may be made without departing from the spirit and scope of this disclosure.

We claim:

1. A thermally assisted magnetic recording (TAMR) device, comprising:
    (a) a main pole (MP) that generates a magnetic field to switch one or more bits in a magnetic medium;
    (b) a waveguide (WG) that provides light to a near field transducer (NFT);
    (c) the NFT formed between the WG and MP and that serves as a plasmon generator (PG) by using light from the WG to excite plasmons that generate near field light, which is transmitted to an air bearing surface (ABS) and produces a heating spot on the magnetic medium thereby lowering the magnetic field required to switch the one or more bits; the PG comprises:
        (1) a front portion having a rod-like shape with a front side at the ABS and two sides aligned orthogonal to the ABS and separated by a first width, a tapered back side with a bottom end at a first height (RODh) from the ABS that is greater than a height of the top end thereof, the tapered backside forms an angle α with a bottom surface of the PG front portion; and
        (2) a back portion having a front side aligned essentially parallel to the front portion backside and separated therefrom with a first dielectric layer having a first thickness, and wherein the PG back portion has two sides separated by increasing width with increasing distance from the first dielectric layer and terminating at a backside that is parallel to the ABS;
    (d) a second dielectric layer formed on the WG and contacting the PG front portion bottom surface; and (e) a third dielectric layer on the WG and contacting a bottom surface of the PG back portion.

2. The TAMR device of claim 1 further comprising a dielectric spacer (PPS) between the PG front portion and MP, and wherein the PPS extends from the ABS to a second height (PPSh) where PPSh<RODh.

3. The TAMR device of claim 2 further comprising a diffusion barrier that adjoins a backside of the PPS and prevents metal diffusion between the MP and PG.

4. The TAMR device of claim 1 wherein the first dielectric layer is AlOx or SiO$_2$ and has a refractive index less than that of the WG.

5. The TAMR device of claim 2 wherein the RODh is from 60 nm to 300 nm.

6. The TAMR device of claim 2 wherein the PG front and back portions are comprised of Au, or an alloy thereof.

7. The TAMR device of claim 2 wherein the first thickness is from 10 nm to 30 nm.

8. The TAMR device of claim 2 wherein the angle α is 45±15 degrees.

9. The TAMR device of claim 2 wherein the PPSh is from 20 nm to 60 nm.

10. The TAMR device of claim 2 further comprised of a fourth dielectric layer formed between the ABS and a tapered front side of a bottom portion of the WG, and that serves as a blocker to prevent uncoupled light in the bottom WG portion from reaching the ABS.

11. The TAMR device of claim 1 wherein the second dielectric layer has a thickness t1 and a first refractive index (RI1), and the third dielectric layer has a thickness t2 and a second refractive index (RI2) where t1>t2, and RI1>RI2.

12. A head gimbal assembly (HGA), comprising:
(a) the TAMR device of claim 1; and
(b) a suspension that elastically supports the TAMR device, wherein the suspension has a flexure to which the TAMR device is joined, a load beam with one end connected to the flexure, and a base plate connected to the other end of the load beam.

13. A magnetic recording apparatus, comprising:
(a) the HGA of claim 12;
(b) a magnetic recording medium positioned opposite to a slider on which the magnetic read head structure is formed;
(c) a spindle motor that rotates and drives the magnetic recording medium; and
(d) a device that supports the slider, and that positions the slider relative to the magnetic recording medium.

14. A thermally assisted magnetic recording (TAMR) device, comprising:
(a) a main pole (MP) that generates a magnetic field to switch one or more bits in a magnetic medium;
(b) a waveguide (WG) that provides light to a near field transducer (NFT);
(c) the NFT formed between the WG and MP and that serves as a plasmon generator (PG) by using light from the WG to excite plasmons that generate near field light, which is transmitted to an air bearing surface (ABS) and produces a heating spot on the magnetic medium thereby lowering the magnetic field required to switch the one or more bits; the PG comprises:
(1) a front portion having a rod-like shape with a front side at the ABS and two sides aligned orthogonal to the ABS and separated by a first width, a tapered back side with a bottom end at a first height (RODh) from the ABS that is greater than a height of the top end thereof, the tapered backside forms an angle α with a bottom surface of the PG front portion; and
(2) a back portion having a front side aligned essentially parallel to the front portion backside and separated therefrom with a first dielectric layer having a first thickness, and wherein the PG back portion has two sides separated by increasing width with increasing distance from the first dielectric layer and terminating at a backside that is parallel to the ABS; and
(d) a second dielectric layer formed on the WG and contacting a back section of the PG front portion bottom surface;
(e) a third dielectric layer on the WG and contacting a bottom surface of the PG back portion; and
(f) a fourth dielectric layer formed between the first dielectric layer and PG front portion at the ABS, and extending to a backside at a second height (h1) where h1<RODh.

15. The TAMR device of claim 14 further comprising a spacer (PPS) between the PG front portion and MP, and wherein the PPS extends from the ABS to a second height (PPSh) where PPSh<RODh.

16. The TAMR device of claim 15 further comprising a diffusion barrier that adjoins a backside of the PPS and prevents metal diffusion between the MP and PG.

17. The TAMR device of claim 15 wherein the first dielectric layer is AlOx or SiO$_2$ and has a refractive index less than that of the WG.

18. The TAMR device of claim 15 wherein the RODh is from 60 nm to 300 nm.

19. The TAMR device of claim 15 wherein the PG front and back portions are comprised of Au, or an alloy thereof.

20. The TAMR device of claim 15 wherein the first thickness is from 10 nm to 30 nm.

21. The TAMR device of claim 15 wherein the angle α is 45±15 degrees.

22. The TAMR device of claim 15 wherein the PPSh is from 20 nm to 60 nm.

23. The TAMR device of claim 15 wherein the second dielectric layer has a thickness t1 and a first refractive index (RI1), and the third dielectric layer has a thickness t2 and a second refractive index (RI2) where t1>t2, and RI1>RI2.

24. The TAMR device of claim 15 further comprised of a fifth dielectric layer formed between the ABS and a tapered front side of a bottom portion of the WG, and that serves as a blocker to prevent uncoupled light in the bottom WG portion from reaching the ABS.

25. A head gimbal assembly (HGA), comprising:
(a) the TAMR device of claim 14; and
(b) a suspension that elastically supports the TAMR device, wherein the suspension has a flexure to which the TAMR device is joined, a load beam with one end connected to the flexure, and a base plate connected to the other end of the load beam.

26. A magnetic recording apparatus, comprising:
(a) the HGA of claim 25;
(b) a magnetic recording medium positioned opposite to a slider on which the magnetic read head structure is formed;
(c) a spindle motor that rotates and drives the magnetic recording medium; and
(d) a device that supports the slider, and that positions the slider relative to the magnetic recording medium.

27. A method of fabricating a TAMR device, comprising:
(a) providing a first dielectric layer on a waveguide;
(b) depositing a second dielectric layer on the first dielectric layer and forming a backside on the second dielectric layer at a first height (h1) from a first plane;

(c) depositing a first plasmon generator (PG) layer on the first and second dielectric layers and forming a tapered backside on the first PG layer that has a bottom end at a second height (RODh) that is greater than a height of a top end of the tapered backside from the first plane, and where RODh>h1;

(d) sequentially depositing a third dielectric layer and then a second PG layer on the first PG layer and on the WG behind the tapered backside, and forming a top surface on the second PG layer that is coplanar with a top surface of the first PG layer;

(e) patterning the first PG layer to form a PG front portion having a rod-like shape between the first plane and third dielectric layer, and the second PG layer to form a PG back portion behind the third dielectric layer, wherein the PG back portion has a substantially triangular shape from a top-down view;

(f) forming a fourth dielectric layer on the PG front portion, and extending from the first plane to a second height (PPSh) from the first plane;

(g) depositing a main pole (MP) layer on the fourth dielectric layer; and (h) performing a lapping process to form an air bearing surface (ABS) at the first plane.

28. The method of claim 27 wherein the tapered backside forms an angle of 45±15 degrees with a bottom surface of the first PG layer.

29. The method of claim 27 wherein the third dielectric layer has a thickness 10 to 30 nm in a direction that is orthogonal to the first plane.

30. The method of claim 27 wherein the RODh is from 60 nm to 300 nm.

31. The method of claim 27 wherein the PG front and back portions are comprised of Au, or an alloy thereof.

32. The method of claim 27 wherein the PPSh is from 20 nm to 60 nm.

33. The method of claim 27 wherein the first dielectric layer has a thickness t1 and a first refractive index (RI1), and the third dielectric layer has a thickness t2 and a second refractive index (RI2) where t1>t2, and RI1>RI2.

* * * * *